United States Patent [19]

Gabbard et al.

[11] 3,940,558

[45] Feb. 24, 1976

[54] REMOTE MASTER/SLAVE STATION CLOCK

[75] Inventors: Ova Gene Gabbard, Germantown; Pradeep Kaul, Rockville; Joaquin Hangen, Olney, all of Md.

[73] Assignee: Digital Communications Corporation, Gaithersburg, Md.

[22] Filed: Jan. 31, 1975

[21] Appl. No.: 546,052

[52] U.S. Cl............ 178/69.5 R; 179/15 BS; 325/58; 325/419
[51] Int. Cl.².......................................... H04L 7/00
[58] Field of Search............ 178/69.5 R; 179/15 BS; 325/58, 419, 420

[56] References Cited
UNITED STATES PATENTS

3,483,330  12/1969  Inose et al...................... 179/15 BS

*Primary Examiner*—Albert J. Mayer
*Attorney, Agent, or Firm*—Pollack, Vande Sande & Priddy

[57] ABSTRACT

A clock for locally distributing a synchronized signal derived from a remotely transmitted signal. The clock normally operates in the slave mode, phase locked to the remotely transmitted signal, when that signal is deemed available. If it is not available the clock switches to a master mode in which it independently generates the necessary signal.

12 Claims, 14 Drawing Figures

REMOTE MASTER/SLAVE STATION CLOCK

FIELD OF THE INVENTION

The clock of this invention provides a stable reliable clock for local distribution synchronized with a remotely transmitted signal and, for times, independently producing said signal when said remotely transmitted signal is unavailable.

BACKGROUND OF THE INVENTION

Systems for the transmission of the digital information, over line wire links, microwave or other radio links, are well known to the art. Some of these systems, either now operating or planned for operation, are thousands of miles in length or more. For those systems which employ synchronous data handling a clock must be available at each data handling locality which is synchronized with the clock at the originating station. To enable any station in the system to communicate with any other station, then, each station must have a local clock available which is synchronized with every other local clock at every other station. In order to effect this a single station is selected as the master and its clock employed for data transmission. The adjacent station generates a synchronous clock for distribution and retransmission. Of course, due to signal degradation, as a result of transmission, the remotely transmitted signal (or clock) must be reconditioned or regenerated at each of the stations. In order to provide a stable synchronized signal for local distribution a phase lock loop, which is a well known circuit configuration, is an obvious choice. However, the very high data transmission rates, up to 20 M bits per second, coupled with the serious consequences at any station of losing the clock, require that in addition to stability, the local clock generation equipment must be highly reliable.

One well known method of increasing reliability of any apparatus is to provide that apparatus in redundant form, that is to provide more than one copy of the apparatus and, when a failure of an operating apparatus is indicated a switch over can be effected to the redundant apparatus. It should be apparent to those skilled in the art that due to the high data rates employed in typical data transmission systems, one cannot rely upon manual switch over between redundant apparatus. Therefor, automatic operating apparatus must be provided to effect a switching operation. In addition, as a further corollary of the reliability requirements, the automatic switching apparatus must be capable of sensing of any one of a number of possible failures (including failure of the failure detecting apparatus) and properly responding thereto in a short a time as posssible.

Merely providing redundant apparatus in automatic equipment to switch out a "failed" unit and switch in a "good" unit will not, however, porvide a complete solution. In addition to the possibility that one of the redundant apparatus may fail, this system must also handle the possibility that the local station will not receive the remotely transmitted signal, or if a remotely transmitted signal is received it is so degraded that synchronizing the local oscillator thereto will actually be detrimental to system operation. Thus, not only must the apparatus respond to effective loss of the remotely transmitted signal but some means must be provided for independently generating the signal and furthermore, such independent local generated signal must meet system specifications.

SUMMARY OF THE INVENTION

The present invention meets the forgoing and other requirements for data transmission systems by providing a station clock which is responsive to a remotely transmitted signal for locally generating a synchronized signal. In order to meet the reliability requirements three independent phase lock loops are provided, each of which is responsive to the remotely transmitted signal for generating a synchronized signal. Means are associated with each phase lock loop for detecting a failure thereof. More particularly, signals of various components of one phase lock loop are compared with corresponding signals of another of the phase lock loops as well as absolute standards. Majority voting logic means responsive to these comparisons determines whether or not a particular one of the phase lock loops has failed, and if that is the case, which of the phase lock loops has failed. Switching means selectively connects one or more of the phase lock loop outputs to an output port for local distribution. The switching means is, of course, controlled by the majority voting logic so that the output of a failed phase lock loop will not be connected to the output port.

In addition to the foregoing apparatus, each phase lock loop independently detects the quality of the remotely transmitted signal it receives and independently determines whether or not it is acceptable. The clock then determines whether or not the remotely transmitted signal is acceptable based upon a majority voting logic comparison of the signal received from each of the phase lock loop detectors responsive to the remotely transmitted signal. If the majority voting logic analysis indicates that the remotely transmitted signal is deemed unavailable, i.e., it is unacceptable, the apparatus switches from the slave mode to the master mode.

Each of the phase lock loops includes an A/D convertor connected to the output of the low pass filter to receive the loop error voltage. The output of the A/D converter is, of course, a digital representation of the phase lock loop error voltage. This output is connected as one input to a multiplexer whose output is connected to a D/A converter. The analog output of the D/A convertor controls the voltage controlled oscillator in the phase lock loop. A serial combination of a digital filter and a digital modifiable memory is connected between the output of the A/D converter and the second input of the multiplexer. In the slave mode the multiplexer passes, to the D/A convertor, the output of the A/D convertor. However, in this mode the digital filter maintains a running "average" of a number of previous samples of error voltage. Of course, the sampled error voltage is indicative of the proper frequency for the voltage controlled oscillator. When the clock switches to the master mode the digital filter output is loaded into the memory and the multiplexer is controlled to block its first input and to pass its second input to the A/D convertor. This action effectively opens the phase lock loop and causes the voltage controlled oscillator to be driven by the sample error voltage. Since the "average" of the sampled error voltage which is generated by the digital filter is now resident in the memory, the voltage controlled oscillator generates a frequency corresponding to the "average" error voltage. Since the digital filter generates a time average error voltage the error voltage will correspond to a frequency which is acceptable. So long as the phase lock loops remote transmitted signal is unacceptable the clock remains in the master mode. In this mode only one of the locally generated signals is allowed to reach the output port. When the remotely transmitted signal is detected as again acceptable a recovery mode is entered.

During the time when the remotely transmitted signal was unacceptable it is possible for the voltage controlled oscillator to "drift" in frequency and/or phase. As a result, at the time the remotely transmitted signal again becomes acceptable, there may be an accumulated error between the remotely transmitted signal and the voltage controlled oscillator output. To ensure proper data handling this accumulated error must be compensated for. This is accomplished in the recovery mode, where the modifiable memory is incremented or decremented to adjust the oscillator frequency. After a predetermined period of time during which the frequency of the voltage controlled oscillator may be adjusted to compensate for the accumulated errors the recovery mode terminates and the clock again enters the slave mode.

BRIEF DESCRIPTION OF THE DRAWINGS

A specific embodiment of our inventive remote master/slave clock is disclosed in this specification when taken in conjunction with the attached drawings in which like reference characters identify identical apparatus and, in which.

DETAILED DESCRIPTION OF THE DRAWINGS

Figure 1:
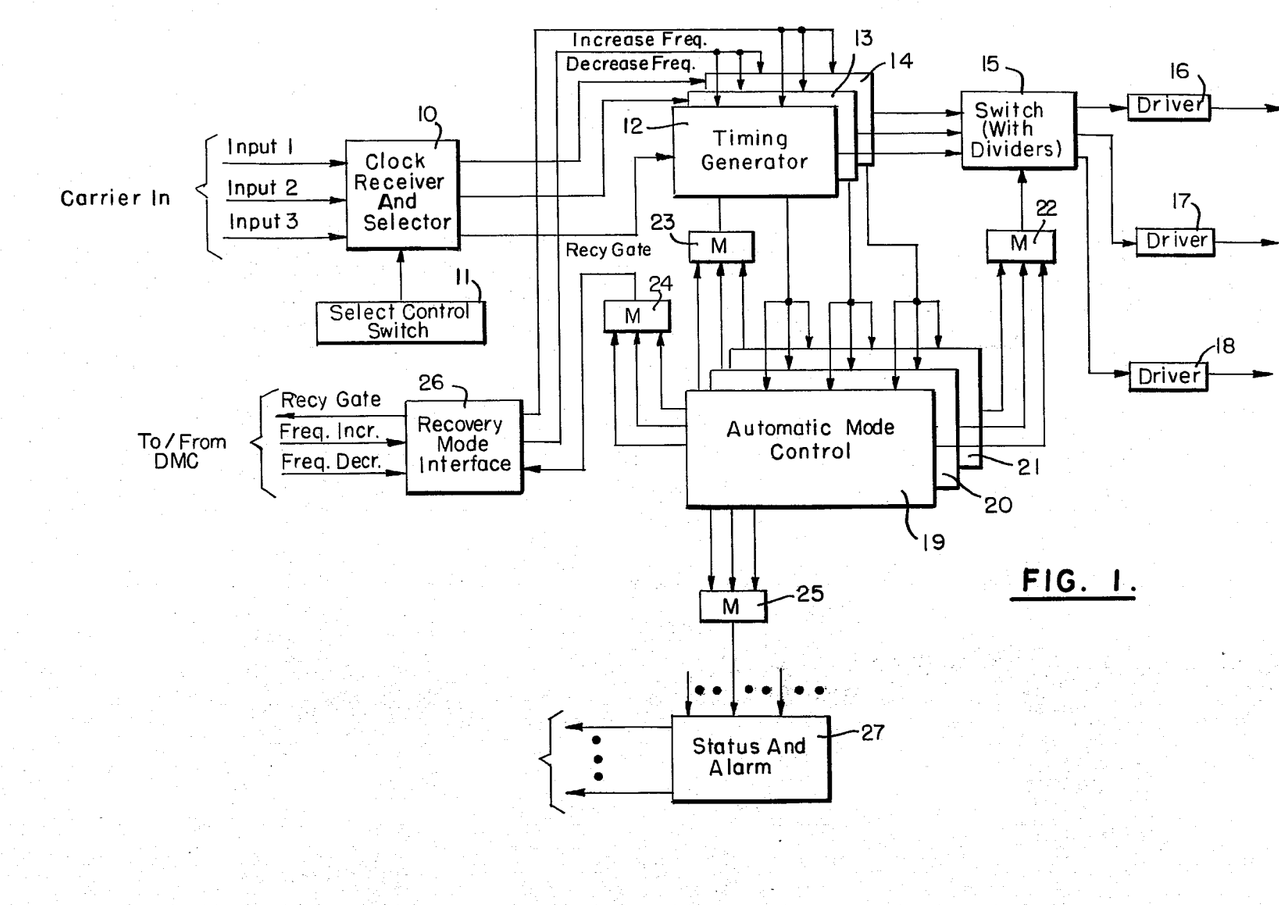
FIG. 1 is a block diagram of our remote master/slave clock illustrating the major functional units.

FIG. 1 is a block diagram of the apparatus of the clock built in accordance with the teachings of the present invention. Before discussing this Figure in detail it will be helpful to briefly set out the context in which this station clock operates. A data transmission system includes a plurality of stations which may be connected one to another via a transmission link such as line wires, microwaves or other radio links. Each of the stations includes a station clock as illustrated in FIG. 1. One of the stations, preferably a station located near the geographic center of the system, may be designated as a master station. This station generates a signal which is used in transmitting, to stations adjacent thereto, any data which the station may be transmitting. Each of the stations receiving the transmission operates in a slave mode and generates a signal which is synchronized with the remotely transmitted signal. This signal, in addition to being employed locally at the station, is also transmitted to stations downstream of the receiving station. In this fashion, each of the stations receives a remotely transmitted signal which is synchronized with a signal generated at the master station.

The station clock illustrated in FIG. 1 includes a clock receiver and selector 10 which has connected to it a plurality of inputs one, two and three. Only one input is selected and this is the input to which the remotely transmitted signal is applied. The effective input is selected by the select control switch 11 connected to the clock receiver in selector 10. Switching apparatus within the clock receiver and selector 10 is operated by the select control switch 11 to route the remotely transmitted signal to each of at least three timing generators 12, 13 and 14. Each of the timing generators 12, 13 and 14 are identical with one another and each provides an output to switching circuit 15. In the slave mode of operation the output of each of timing generators 12, 13 and 14 provided to switch 15 is a locally generated signal which is synchronized with the remotely transmitted signal. In a manner to be described hereinafter switch 15 combines its inputs and provides the combination to driver 16. Driver 16 is connected to the output port to thus make available the locally generated signal which is synchronized with the remotely generated signal. For some applications signals synchronized with the signal but at sum-multiples thereof are also desired at the stations. To effect this switch 15 also includes one or more divider chains to provide such synchronized signals at sub-multiple frequencies of the remotely generated signal. Illustratively, driver 17 and 18 are illustrated as receiving divided outputs from switch 15 and making available such lower frequency signals to still other output ports for local distribution and use.

As has been mentioned above the station clock operates in one of three modes, in the slave mode the clock provides, to an output port, a locally generated signal synchronized with the remotely transmitted signal. If, based on criteria to be explained hereinafter, the station clock determines that the remotely transmitted signal is unavailable the station clock enters the master mode in which a signal is locally generated which is independent from the remotely transmitted signal. Finally, when the remotely transmitted signal is again detected as being available the station clock enters the recovery mode to compensate for the effects of drift in the master mode. At the conclusion of a predetermined interval of time, the recovery mode terminates and station clock again enters the slave mode.

As used in the foregoing description the term "unavailable" as applied to the remotely transmitted signal is intended to mean that either the remotely transmitted signal is completely unavailable or, the remotely transmitted signal which is available is so degraded in amplitude and/or frequency, that it would be detrimental to synchronize the locally generated signal thereto.

Based upon signals received from each of the timing generators 12, 13 and 14 with respect to the quality of the remotely transmitted signal, each of a plurality of automatic mode control circuits 19, 20 and 21 may determine that it is necessary to switch from a slave to a master mode. Furthermore, each of the timing generators 12, 13 and 14 include failure detecting circuits of two types. One type of failure detecting circuit is independent from any other timing generator and may determine a failure based on an absolute standard. For instance, the phase failure detector circuit is included in each timing generator 12, 13 and 14. A voltage comparator triggers an alarm whenever the output of the phase detector reaches a predetermined level indicating an improper phase relation between the local generator signal and the remotely transmitted signal. The other type of failure detecting circuit is a relative failure detecting circuit which compares corresponding signals from two timing generators and detects a failure if a difference between these signals exceeds a preestablished minimum.

Based upon the foregoing plurality of failure detecting signals each of the automatic mode controls 19, 20 and 21 determines whether the remotely transmitted signal is acceptable, whether any timing generators has an absolute failure or a relative failure. A plurality of majority voting logic means 22, 23, 24 and 25 responds to signals received from each of the automatic mode control circuits 19, 20 and 21 on a majority voting principal selects both the mode of the station clock, which of the timing generator outputs to pass switch 15 to the output port and what status and alarm signals to be transmitted by the status and alarm circuit 27. In addition, if the majority voting analysis determines that the clock should enter the recovery mode then a recovery gate is generated by the majority voting logic means 24 and transmitted to the recovery mode interface 26. The recovery mode interface 26 interfaces the station clock with associated equipment at the station. In response to the recovery gate, transmitted to it, the associated equipment may request either a frequency increase or frequency decrease. Whichever signal is received (if any) is then passed on to all three of the timing generators 12, 13 and 14 for appropriate modification of the locally generated signal in a manner to be explained hereinafter.

Before discussing the detailed block diagrams which illustrated the configuration of the various components of the station clock illustrated in FIG. 1, a brief recitation of the system operation in its various modes will enable the reader to more easily understand the functions which are required by the various components.

The remotely transmitted signal which is received by the clock receiver and selector 10 is reshaped and sent in parallel to the triple redundant timing generators 12, 13 and 14. If more than one remotely transmitted signal input is connected, the select control switch 11 determines which input is effective. Each timing generator consists of a stable voltage controlled oscillator in a phase lock loop and a loop control. Together they operate as a narrow band, high stability phase lock loop with controlable memory internal to the loop. The timing generators also contain a number of failure detectors for determining the status of the remotely transmitted signal as well as the internal status of each generator. The results of all failure detectors are fed in triple redundant fashion, to three automatic mode control circuits 19, 20 and 21 where control decisions are made. The outputs of the automatic mode control circuits 19, 20 and 21 are fed to the plurality of majority logic circuits 22, 23, 24 and 25. When two or three of the automatic mode circuits 19, 20 and 21 indicate a certain control should exist or that a failure has occurred then the output of the respective majority logic means will implement the control function or send an alarm via the status and alarm circuit 27.

When the remotely transmitted signal is at proper amplitude and within a predetermined frequency limits the remotely transmitted signal will be considered "good" by the failure detectors and the automatic mode controls 19, 20 and 21 will vote a slave mode. In an embodiment of our invention which has been constructed in which the signal was nominally 21.504 MHz we employed frequency limits of ± 3 Hz in the slave mode and ± 2 Hz in the master mode. In the slave mode all three timing generators will independently phase lock to the remotely transmitted signal. The output of all three timing generators will be identical to the input frequency and within 40°, for example in phase but there will be about a 30 or 40:1 reduction in RMS jitter. The remotely transmitted clock originates on a clock recovery loop in the above mentioned embodiment employing a PSK demodulator with a double sided band width of about 2 KHz. The timing generator's phase lock loops have band widths of about 6 Hz, accomplishing a large reduction in jitter. In the slave mode the output of all three timing generators are fed to the switch 15. If all three generators are operating properly the output of the switch is a combination of these outputs. If one timing generator fails in amplitude or frequency the majority logic will disable the "bad" input and properly bias the input to the majority logic gate. If non-like failures occur in two of the three timing generators then the automatic mode controls and the majority logic will turn off both bad inputs and the output would be from the one good timing generator. The status and alarm circuit 27 generates an alarm indicating that a failure or failures have occurred.

The combined outputs from the timing generators 12, 13 and 14 then goes in parallel to buffers and internal dividers in switch 15. The various outputs from the switch 15 then drive the drivers 16, 17 and 18.

If the remotely transmitted clock becomes unavailable i.e., the amplitude or frequency depart from the nominal by greater than the pre-established standards then the failure detectors in each timing generator 12, 13 and 14 will provide a "bad" input signal to the automatic mode controls 19, 20 and 21. Based on a majority vote of the automatic mode controls 19, 20 and 21 the associated timing generators 12, 13 and 14 will be commanded to the master mode.

Shortly prior to entering the master mode each phase lock loop of the timing generators were tracking normally. Each loop has an A/D convertor, a low cut-off frequency digital filter a modifiable digital memory and a D/A converter plus associated control circuitry. The A/D - memory - D/A apparatus provides a means of storing frequency (actually, a loop error voltage) long term. During normal slave operation a new sample of error voltage is taken and converted to a digital word. Periodically (for example every 0.1 seconds) during normal slave mode operation one of these words is loaded into the digital filter which effectively updates an n-sample long "running average" of the error voltage with every new sample. In the embodiment referred to above we employed a filter containing 256 samples.

When the remotely transmitted signal fails and switch over to the master mode occurs, the stored error voltage is passed to the modifiable memory and the phase lock loop is opened. No further samples of the error voltage are taken and the modifiable memory is employed as an holding register to drive the D/A convertor. Therefore, a constant DC voltage is sent from the D/A convertor to the voltage controlled oscillator. This value of error voltage is relatively old since the filter acts as a delay by reason of its time constant (in the referred to embodiment the time constant of approximately 26 seconds was employed). A "good" frequency is therefor establihsed as the secondary master clock. As long as the remotely transmitted signal is deemed unavailable the phase lock loop simply holds the last known good frequency.

In the master mode the three timing generators are not phase locked but tend to drift slowly in phase, relative to each other. Majority logic combining cannot, therefore, be used to derive the output clock. Instead, the automatic mode controls 19, 20 and 21 select, again by a majority logic, one and only one of the timing generators 12, 13 and 14 as the effective output from switch 15. Normally, timing generator 12, for example, would be selected as the effective clock unless it is determined to have failed.

The digital filters and memories in the timing generators are monitored in the master mode. If one of these memories departs, in numerical content, from the other two by greater than a pre-established standard (12.5% in our referred to embodiment) then that timing generator is considered failed and rendered ineffective.

When the remotely transmitted signal returns to normal the clock reverts back to its slave mode through the recovery mode. Normally the recovery mode is only entered when the remotely transmitted signal returns to within pre-established frequency limits (such as plus and minus 2 Hz). However, if the stored error voltage exceeds a pre-established standard a different limit (± 6 Hz) is employed.

By reason of drift in the master mode each of the timing generators may have slipped out of synchronism with the unavailable transmitted signal. When the fault in the remotely transmitted signal clears the failure detectors in each of the timing generators indicate an acceptable remotely transmitted signal. The automatic mode control circuits 19, 20 and 21 then, based on a majority vote, determine to enter the recovery mode and the associated timing generators are appropriately operated. The recovery gate is generated by the majority voting logic means and is sent to the associated equipment. That equipment may respond with a signal to either increase or decrease the locally generated frequency. The manner in which this signal is employed to change the voltage controlled oscillator frequency will be explained hereinafter. Suffice to say here, however, that the recovery mode last for a pre-established period of time. During the switch over from the master mode - recovery mode - slave mode, a "master mode extended" signal is provided to prevent false alarm signals from being generated.

Figure 2:
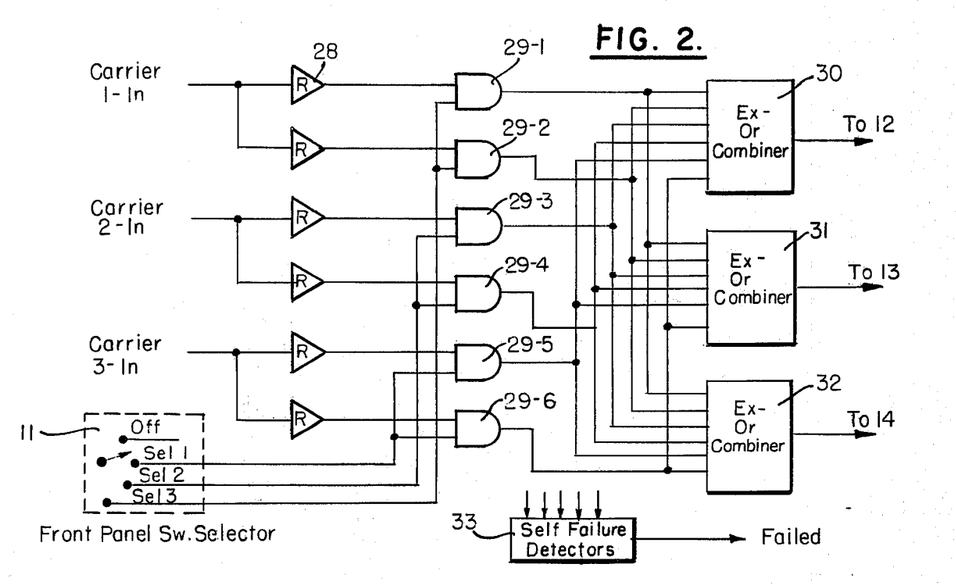
FIG. 2 is a detailed block diagram of the clock receiver and selector and select control switch.

FIG. 2 is a detailed block diagram of the clock receiver and selector 10 and select control switch 11. Three input terminals connect, respectively signal 1, signal 2 and signal 3. Each input terminal is connected to a pair of receiving amplifiers 28 and thus, each input signal generates a pair of outputs from its respective associated receivers. A plurality of AND gates 29 are provided, each with a pair of inputs. One input of each of the AND gates 29 is connected to a single receiver output. Each pair of AND gates 29 associated with each of the input terminals has its second input connected to one of three possible terminals in the select control circuit 11. The select control switch can enable any pair of AND gates associated with a single one of the inputs, or it can enable none of the AND gates (in the OFF position). The output of each of the AND gates 29 are fed to each of three exclusive OR combining circuits 30, 31 and 32. Each of the exclusive OR combining circuits 30, 31 and 32 includes three OR gates, each with two inputs. Each of the OR gates are connected to the outputs of a pair of AND gates associated with a single input. Thus, exclusive OR circuit 30 has three two input OR gates, one connected to the output of gates 29-1 and 29-2, a second connected to the output of gates 29-3 and 29-4 and a third connected to the output of AND gates 29-5 and 29-6. The output of each of the OR gates is then applied as an input to one of two exclusive OR gates. The output of one exclusive OR gate forms a second input to the second exclusive OR gate. The output of the second exclusive OR gate, in exclusive OR circuit 30 is then connected as the input to timing generator 12. Identical circuitry is contained in each of exclusive OR circuits 31 and 32 which are respectively inputs to timing generators 13 and 14.

The purpose of the clock receiver and selector is to receive, amplify and buffer anyone of the three input signals, which are the remotely transmitted signals. As is illustrated in FIG. 2 the selection is done with manual switch positioning. However, it is within the scope of our invention to provide electronic switching or remove and/or automatic input selection. Self failure detectors 33 are connected, via plurality of exclusive OR gates to several key points for comparing proper frequency and phase relationships.

Figure 3:
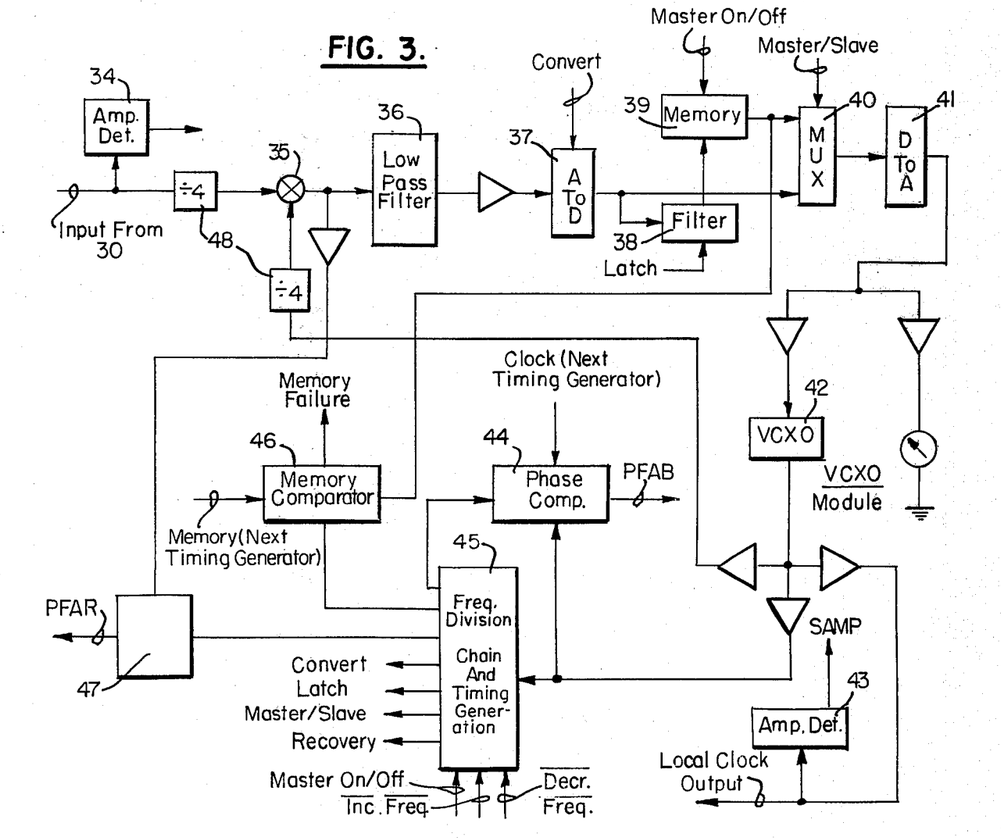
FIG. 3 is a block diagram of a timing generator.

FIG. 3 is a block diagram of any one of the timing generators 12, 13 and 14. In particular, the timing generator is a narrow band width highly stable phase lock loop with memory. It provides the basic local signal from which all outputs of the station clock are derived. The timing generator may operate in a slave or a master mode. The loop tracks the received signal when in the slave mode, and is capable of maintaining the same frequency in the event the remotely transmitted signal is unavailable by means of a memory that stores a digitally filtered representation of a previous good loop error voltage. The loop band width is typically very narrow (in our embodiment between 1 and 4 Hz) so, in order to remain locked at the nominal frequency the voltage controlled crystal oscillator of the loop is very stable with temperature and time. The noise band with the loop is also quite narrow (typically between 2 and 8 Hz) thus providing substantial jitter reduction. A damping factor of about 0.61 is selected representing a compromise between loop stability and jitter immunity.

The timing generator includes the phase lock loop and associated control and failure detecting circuitry, illustrated in FIG. 3. The input to any of the timing generators 12, 13 and 14 is connected to an amplitude detector 34 for detecting whether or not the amplitude of the remotely transmitted signal is acceptable. This detector performs an RC integration of the rectified remotely transmitted signal and is provided with a time constant of approximately 100 nanoseconds so that the detection of amplitude failure may be done rapidly. As illustrated in FIG. 3 the loop actually operates at one-fourth the frequency of the input by reason of the divide by 4 flipflops connected to each of the inputs of phase detector 35. Those of ordinary skill in the art will understand that the actual operating frequency of the loop may be varied and that division by other factors can be employed, or can be omitted. The output of the phase detector 35 comprises the loop error voltage along with high frequency components which are filtered out by the low pass filter 36. The output of the low pass filter 36, after amplification, is provided as an input to the analog to digital convertor 37. The output of analog to digital convertor 37 is provided as one input to multiplexer 40. The output of the analog to digital convertor 37 is also provided to digital filter 38 whose output is provided to memory 39. The output of memory 39 is connected as the second input to multiplexer 40. The output of the multiplexer 40 is fed to digital to analog convertor 41 whose output, after amplification, controls the voltage controlled oscillator 42. As is illustrated in FIG. 3 the error voltage input to the voltage controlled oscillator may be monitored by means of a meter. The output of the voltage controlled oscillator is, after amplification, and frequency division provided as the second input to the phase detector 35. In addition, the output of the voltage controlled oscillator 42 is also provided to an amplitude detector 42 which provides a local amplitude failure signal. This amplitude detector is an RC integrator following a diode rectifier with a time constant of approximately 100 nanoseconds. This relatively fast time constant allows switch over in response to amplitude failure detection in less than 400 nanoseconds.

The output of the voltage controlled oscillator is also provided as an input to a frequency division chain and timing generation circuit 45. One of the outputs of this frequency division chain 45 is a signal CONVERT which controls the rate at which A/D convertor 37 provides digital samples. A second timing signal from circuit 45 is LATCH which is applied to digital filter 38 to determine the rate at which new error voltage samples are added to the filter. Other control and timing signals include a timing signal to upcount or downcount the memory 39 in the recovery mode, a timing signal to terminate the recovery mode and a signal MASTER/SLAVE to control the multiplexer 40 when switching from slave to master mode.

Each timing generator includes a total of five failure detectors. The first, the remotely transmitted amplitude detector 34 has been discussed above as well as the detector 43 to detect a failure in the local oscillator amplitude. These two detectors are absolute in the sense that the input amplitude or local oscillator amplitude is compared with a predetermined standard for failure determination. If either of these two detectors indicate a failure is due, either to the signal amplitude falling below the predetermined level or a failure in the detector itself. Detector 34 produces a signal which will be hereinafter referred to as RAMP (Remote Amplitude) and the detector 43 produces a signal SAMP (Self Amplitude).

Another failure detector is phase comparator 44 which compares the phase of the local oscillator signal with the phase of the local oscillator signal on another timing generator. When the output voltage of this phase detector 44 exceeds a predetermined threshold (and meets other criteria — see FIG. 9B) the signal PFAB is produced where A identifies the timing generator associated with the phase comparator 44 and B identifies the timing generator which provides the other input to phase comparator 44. This failure detector is, of course, relative in that which of the two timing generators has failed has not been uniquely identified.

Failure detector 47 senses the output of phase detector 35 and, if the phase detector output exceeds the predetermined standard (and meets other criteria — see FIG. 9B) a failure detection signal PFAR is produced where A identifies the timing generator associated with the detector 47 and R refers to the remotely transmitted signal input.

Finally, failure detector 46 comprises a memory comparator which compares the most significant bits (in the referred to embodiment the four most significant bits are employed) of memory 39 with corresponding bits in a memory on an adjacent timing generator. The unit actually accomplishes a one's complement addition and declares a failure if the two memories differ by more than a predetermined amount. This comparison is effected every time the memory is updated or when the clock is in the master mode.

Now the various circuits which make up the automatic mode control (AMC) will be discussed. As is shown in FIG. 1 there are three identical AMC's, 19, 20 and 21. Each AMC performs essentially two types of failure checks including;

a. a self amplitude failure, remotely transmitted signal amplitude failure, and a self phase versus a remotely transmitted signal phase check b. a self versus other check including a self phase versus next phase check, and a self memory versus next memory check.

The failure signals come from each of the three timing generators 12, 13 and 14. Based upon an analysis of these signals the status of each timing generator is determined.

Figure 4A:
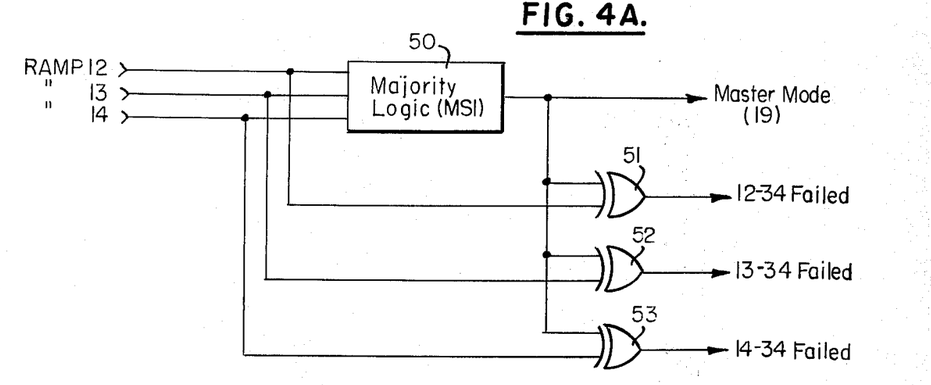
FIGS. 4A and 4B illustrate two types of typical majority logic analysis circuits employed in various portions of the inventive apparatus.

FIG. 4A illustrates the majority voting logic analysis employed in the first type of check. In this example signals from each of the received amplitude detectors 34 are fed to a majority logic network 50. These separate inputs are labled RAMP-12, referring to the amplitude detector 34 from timing generator 12, RAMP-13, referring to the amplitude detector 34 in timing generator 13 and, finally RAMP-14, referring to the amplitude detector 34 in timing generator 14. Each of these input signals is also provided as one input to an exclusive OR gate 51, 52 or 53. The output of the majority logic network 50 is also provided, as the second input to each of the exclusive OR gates 51, 52 and 53. The majority logic network 50 tally's the voting and the status of the RAMP. If two or more signals indicate a failure than the signal MASTER MODE (19) is generated to indicate that AMC 19 has detected a failure of the remotely transmitted signal amplitude. The function of the exclusive OR gates 51, 52 and 53 is to determine if there is any variance between the three inputs from that of the majority logic gate output. If one input is different from the majority logic gate output, the timing generator associated with that input is indicated as having failed. Thus, exclusive OR gate provides the signal 12-34 failed indicating that detector 34 associated with timing generator 12 has failed. An additional check is accomplished to determine if the output of the majority logic gate 50 differs from all three inputs. In this case, then the associated AMC itself labled as a failure.

The remaining two failure detector checks provide failure signals indicating that one of a pair of timing generators do not agree, either in memory content or in phase. That is the output of either detector 46 or 44. For instance, the phase of timing generator 12 is compared with that of 13 in phase comparator 12-44 the output from this detector is sent to all three AMC units 19, 20 and 21. The phase of timing generator 13 is compared with that of timing generator 14 in detector 13-44 and a failure signal is sent to all three AMC units 19, 20 and 21. Finally, the phase of timing generator 14 is compared with that of timing generator 12 in detector 14-44 and a failure signal is sent to all three AMC units. If, for example, we assume that timing generator 12 is not phased locked and is slowly drifting then signals PF 12-13 and PF 14-12 will indicate a failure implying that timing generator 12 has failed. If timing generator 13 fails then PF 12-13 and PF 13-14 will indicate failure. If timing generator 14 fails then PF 13-14 and PF 14-12 will indicate failure. Thus, for a valid failure at least two failure signals must be enabled and the common generator is identified as having failed. However, if only one failure signal is enabled this implies that the detector itself has failed. The same principal is applied to the memory failure detector and signals as follows MF 12-13, MF 13-14 and MF 14-12 are generated. These signals are also sent into all three AMC units 19, 20 and 21. Again, two failure signals must be enabled for a valid failure and if only one fails, the detector is labeled as having failed.

Figure 4B:
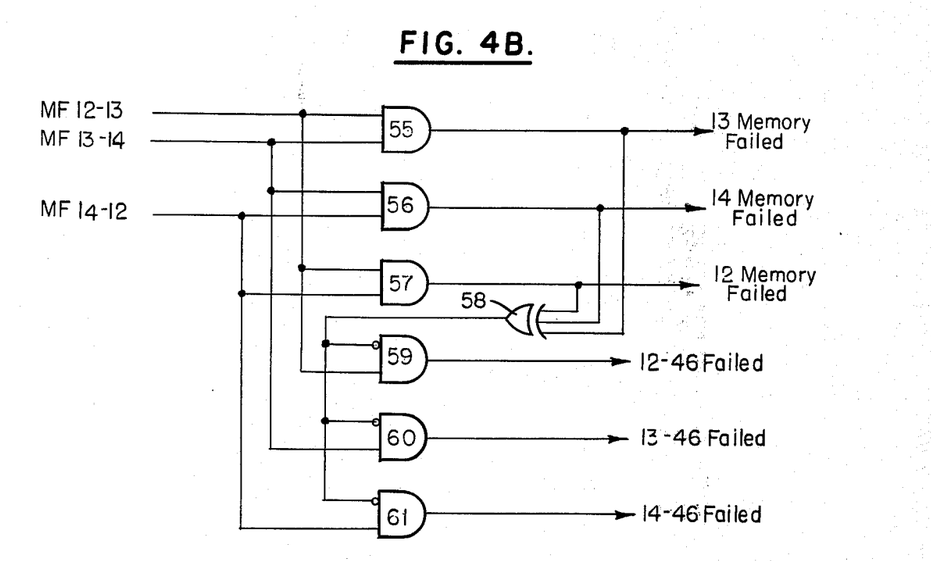

The apparatus illustrated in FIG. 4B is typical of the analysis described above. As shown in FIG. 4B three AND gates 55, 56 and 57 are provided each having two inputs and having their inputs connected to different combinations of the signals MF 12-13, MF 13-14 and MF 14-12. The output of AND gate 55 indicates that a memory on timing generator 13 has failed, the output of AND gate 56 indicates that the memory on timing generator 14 has failed and the output of AND gate 57 indicates that the memory on timing generator 14 has failed and the output of AND gate 57 indicates that the memory on timing generator 12 has failed. If the outputs of each of AND gates 55, 56 and 57 are low, that indicates that no memory failures have been detected. Thus, the output of OR gate 58, each of whose inputs is connected to a different one of the outputs of AND gates 55, 56 and 57 will also be low. This output, negated, is applied as an input to each of AND gates 59, 60 and 61. The other input to each of these AND gates is derived from a different one of the signals MF 12-13, MF 13-14 and MF 14-12. If any of AND gates 59, 60 and 61 produce a high output it will only be because a single memory failure detector signal has been generated. This, as referred to above, indicates, not a failure of a memory, but a failure of a memory detector. Thus, the output of AND gate 59 indicates that the detector 12-46 has failed (detector 46 associated with timing generator 12) where as the output of AND gate 60 indicates that detector 13-46 has failed and the output of AND gate 61 indicates that detector 14-46 has failed.

There are several other signals that come from the timing generators which are not error signals but status signals. MASTER EXTENDED is one of them. This is received from all three timing generators and a majority vote is performed. An error analysis as explained above is also accomplished. The majority vote is used to inhibit some of the error signals while in master mode since they would have no meaning. The only failure signals enabled during master modes are the SAMP and MFAB. The MASTER EXTENDED signal is enabled for approximately 3 seconds after the timing generator goes to the slave mode. During the transistion many error signals are generated since each timing generator switches semi-independently to slave. However, these signals are disregarded since we are still disabled by MASTER EXTENDED. Finally, when the MASTER EXTENDED drops, the system is stabilized and all failure signals are activated again.

Another status signal received from all three timing generators is the recovery mode signal. This is also majority voted on and an error analysis takes place as explained above. The generation of the recovery mode signal will be explained. All the error signals associated with timing generator 12, for instance, are combined in a multi-input OR gate to form a timing generator 12 failed signal. The same is done with timing generators 13 and 14.

Based upon these failures a selection is made as to which timing generator will be effective. In the slave mode all three timing generators are selected. Upon a failure only the failed one is turned off. In the master mode, however, only one timing generator at a time is selected, or turned on. The decision is weighted to select timing generator 12, for instance, unless that is failed. If timing generator 12 has failed, then 13 is selected. If all three are indicated as failed, then the AMC unit is considered failed.

This may occur whenever a majority logic gate fails and its outputs are compared with the three inputs. All three will register as bad and thus all three timing generators will be labled as failed by this particular AMC unit only. The AMC failed signal drives the status light and is also sent to the majority logic means.

Figure 4C:
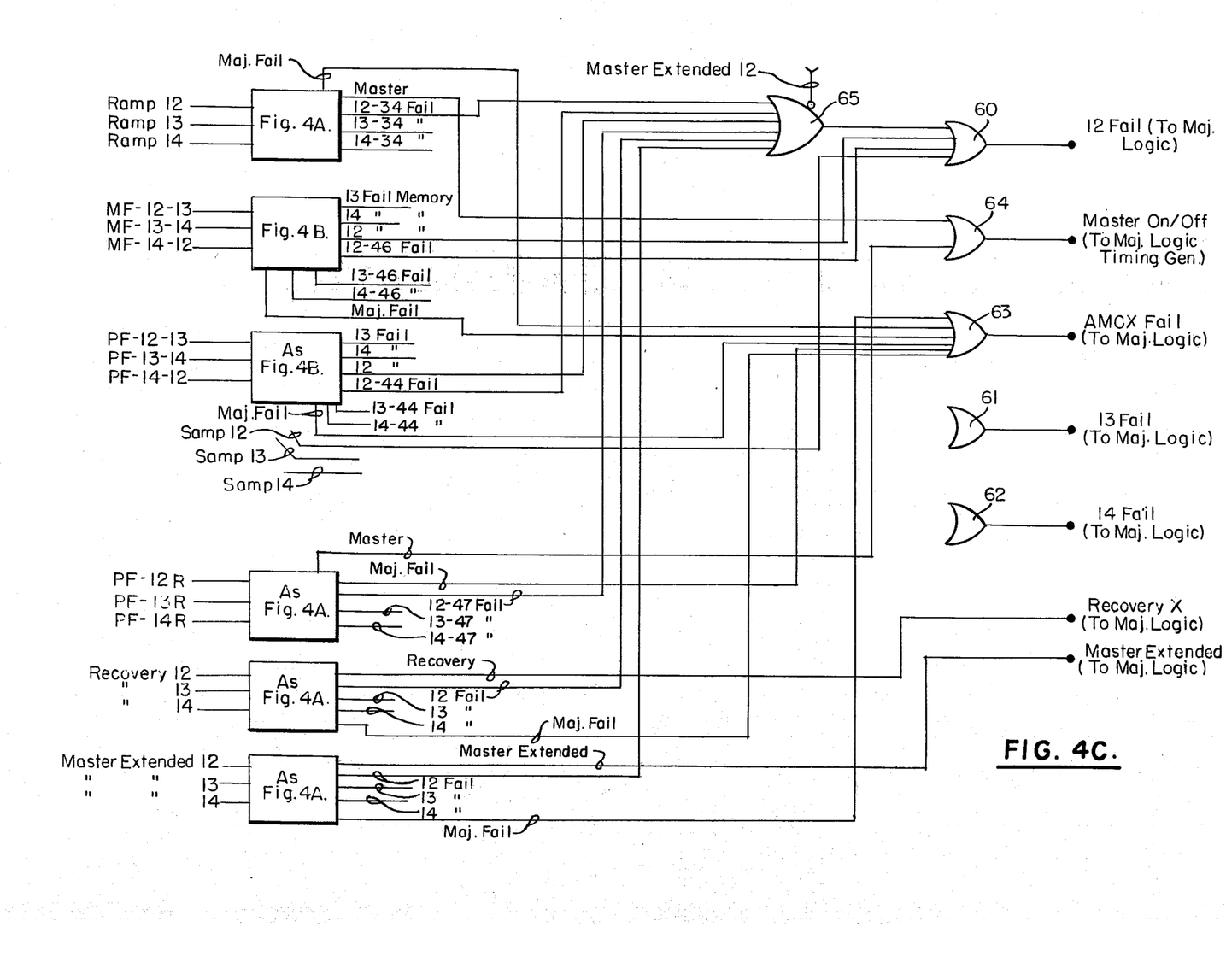
FIGS. 4C and 4D are detailed block diagrams of automatic mode control circuit.

FIG. 4c schematically illustrates a number of the inputs and outputs of a typical AMC unit. And as has been discussed above the RAMP signals, and PFAR signals are voted on in circuits similar to FIG. 4A. In addition, the RECOVERY A (where A refers to the timing generator producing the signal) as well as MASTER EXTENDED A signals are also provided to circuits similar to FIG. 4A. The circuit of FIG. 4A determines whether or not at least a majority of the inputs agree, if they do then, for instance, the RAMP signals result in a MASTER ON/OFF; similarly the PFAR signals also can produce a MASTER ON/OFF; RECOVERY A can produce RECOVERY X and MASTER EXTENDED A can produce MASTER EXTENDED X (where X refers to the AMC unit). If anyone of the inputs dissents, it is labled as failed. Finally, if the inputs do not agree with the output, then the AMC unit itself is labled as failed.

The relative failure signals MFAB and PFAB are provided to circuits similar to the one illustrated in FIG. 4B. The outputs of these circuits indicate that either the memory or the detector of a particular timing generator has failed or that the majority logic itself has failed.

All signals which indicate that a timing generator, or a component thereof have failed are brought together at OR gate 60, relative to timing generator 12, which produces a 12 fail signal, directed to the majority logic unit to be described hereinafter. A number of failure signals are conducted directly to OR gate 60; i.e., those related to a memory or memory detector failure and the signal indicating a local oscillator amplitude failure (SAMP). The remaining signals indicating a failure of a timing generator or a component thereof are directed to OR gate 65 which, of course, produces an output if it receives any input, except in the case when its inhibit signal is present. OR gate 65 is inhibited when the clock is in the master mode or for a short period of time thereafter when the MASTER EXTENDED signal is high. In the master mode these failure signals have no meaning. For a predetermined short (such as 3 seconds) period subsequent to the master mode, that is during the recovery mode and to some extent into the slave mode, these failure signals are suppressed because they may be generated by switching transients. Similarly OR gates 61 and 62 generate 13 fail and 14 fail signals for the majority logic. The RECOVERY X and MASTER EXTENDED X signals, if produced are also directed to the majority logic. All signals which indicate that an AMC unit has failed are brought together in OR gate 63, which produces AMCX fail (where X indicates the identity of the automatic mode control unit). This signal is also directed to the majority logic unit. Finally, OR gate 64 produces the signal MASTER ON/OFF, indicating the master mode, if either the majority of the RAMP or PFAR signals so indicate. This signal is directed to the majority logic unit and to the timing generator associated with the automatic mode control unit.

As is illustrated in FIG. 1 there are three automatic mode control units each of which provide the plurality of inputs illustrated in FIG. 4C to a majority logic unit.

Figure 4D:
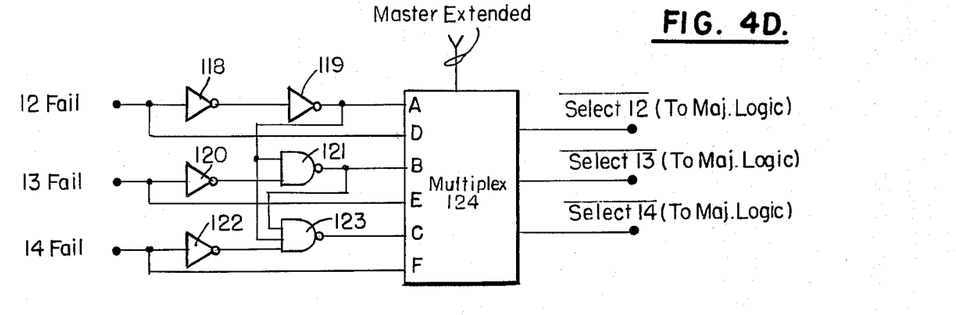

FIG. 4D illustrates the apparatus in the automatic mode control unit which produces the signals governing the selection of the effective timing generator or generators. The signals produced by OR gates 60, 61 and 62, which are respectively 12 fail, 13 fail and 14 fail are provided as inputs to inverters 118, 120 and 122, respectively, as well as to the D, E and F inputs of a multiplexer 124. The output of inverter 118 is provided as the input to inverter 119 whose output is provided as the A input to multiplexer 124 and is also provided as one input to NAND gate 121. The output of inverter 120 provides the second input to NAND gate 121, whose output is provided as the B input to multiplexer 124. The output of inverter 122 is provided as one input to NAND gate 123. The other two inputs for NAND gate 123 are derived from the output of inverter 119 and NAND gate 121, respectively. The output of NAND gate 123 is provided as the C input to multiplexer 124. The multiplexer 124 also receives the MASTER EXTENDED signal on the control input. When in the slave mode, the MASTER EXTENDED is low and thus the D, E and F inputs of multiplexer 124 are effective. Assuming that the timing generator fail signals are all low then the multiplexer 124 produces a low output corresponding to $\overline{\text{SELECT 12}}$, $\overline{\text{SELECT 13}}$ and $\overline{\text{SELECT 14}}$. After majority voting in the majority logic unit, these signals will allow the outputs of each of the timing generators to pass the clock switch and be combined for output to the output port. If, however, any one or more of the timing generator fail signals go high the corresponding multiplexer outputs will also go high to disable the associated timing generator output from passing the clock switch, in a manner which will be explained with respect to FIG. 6.

In the master mode, and for the short period of time subsequent thereto, when the MASTER EXTENDED signal is high then the D, E and F inputs to multiplexer 124 are rendered ineffective and the A, B and C inputs are effective. In this condition, and assuming that the 12 fail signal is low the $\overline{\text{SELECT}}$ 12 output of multiplexer 124 will also be low thus selecting timing generator 12. However, neither NAND gate 121 nor 123 will be enabled and thus their respective outputs will be high providing high outputs on $\overline{\text{SELECT}}$ 13 and $\overline{\text{SE-}}$ $\overline{\text{LECT}}$ 14 which signals, after majority voting, will deselect the outputs of timing generators 13 and 14. However, if in the master mode timing generator 12 fails the 12 fail signal going high will cause NAND gate 121 to be enabled and thus timing generator 13 will be selected rather than 12 or 14.

The primary function of the majority logic unit is to control the various modes of the clock based on the majority combination of the control signals generated by the various AMC units. If the clock has no failures, then each of the AMC generated signals will coincide and the majority vote will always be unanimous. However, should a component in the AMC unit fail then one of its outputs to the majority logic unit may differ from the other two corresponding AMC outputs. This will be registered as an AMC failure by a comparison of the majority voted outputs versus its inputs. The timing generator selection signals (12 SEL X, 13 SEL X, 14 SEL X, where X identifies the AMC unit generating the selection signal) are majority voted on. The timing generator 12 selected signal is disabled by SAMP-12 and enables 13 selected. The timing generator selection signals from the majority logic unit go to two places, the switch 15 and the timing generator. At switch 15 they select one of the three timing generator outputs. At the timing generator this signal may serve to illuminate indicators to indicate the unit which is on line.

Figure 5:
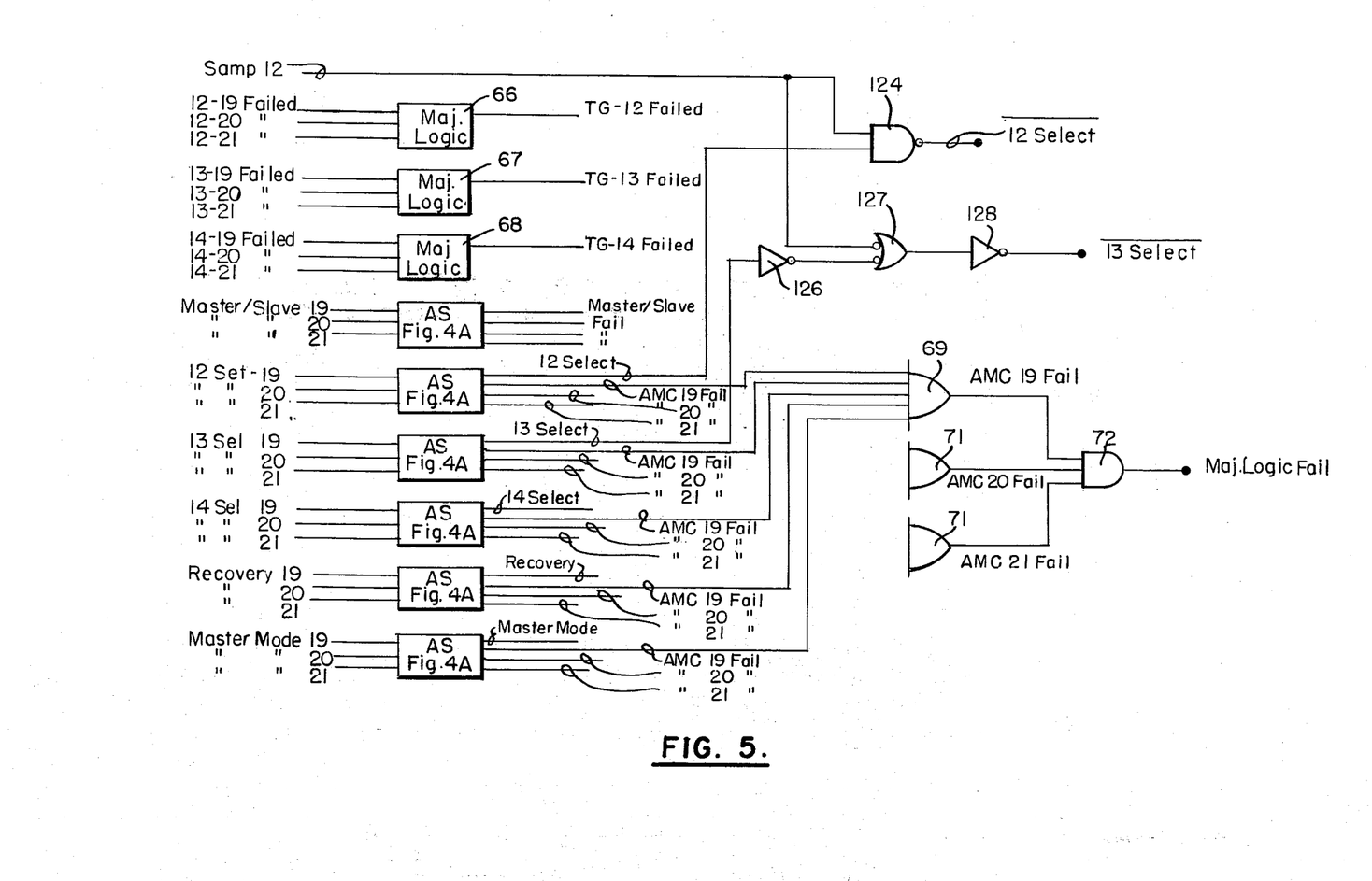
FIG. 5 is a detailed block diagram of the majority logic circuit.

FIG. 5 illustrates, diagrammatically, the more important functions of the majority logic which is a composite of the majority logic modules 22, 23, 24 and 25 illustrated in FIG. 1.

As shown in FIG. 5, the signals from the various automatic mode control units 19, 20 and 21 are combined, in the majority voting logic module, which, in the main, employs the circuit illustrated in FIG. 4A. This circuit allows a majority or unanimous vote between the different inputs, and, if one of the input signals are different from the other two identifies a failure of the unit providing that signal. Thus, the MASTER/SLAVE signal is majority voted on as is the $\overline{12}$ $\overline{\text{SELECT}}$, $\overline{13 \text{ SELECT}}$ and $\overline{14 \text{ SELECT}}$ signals as well as the recovery signals and master mode signals. All signals which indicate a particular automatic mode control unit failure are brought together in a different OR gate, such as OR gate 69, 70 and 71. If any of these OR gates receives an input it produces a signal indicating that either automatic mode control 19 has failed, automatic mode control 20 has failed or automatic mode control 21 has failed. If all three mode control units are identified as having failed, AND gate 72 produces a signal indicating that the majority logic itself has failed.

In order to provide rapid switch over, in the master mode, if a timing generator fails a special circuit employing AND gate 124, OR gate 127 and inverters 126 and 128 is employed. In the master mode, timing generator 12 is normally selected and therefore the signal 12 SELECT would be high. Assuming there is no local oscillator failure the $\overline{\text{SAMP-12}}$ will also be high. Thus, NAND gate 124 will produce the $\overline{12 \text{ SELECT}}$ signal which will be low. At the same time, however the 13 SELECT signal will be low, inverter 126 will produce a high output and OR gate 127 will produce a low output. Thus, inverter 128 will produce a high output ensuring that timing generator 13 is not selected. If, however, the local oscillator in timing generator 12 fails then the signal $\overline{\text{SAMP-12}}$ will go low. This will have two effects. At NAND gate 124 a high output will be produced, immediately deselecting timing generator 12. At the same time, the output of OR gate 127 will go high, forcing the output of inverter 128 to go low thus selecting timing generator 13.

This arrangement merely speeds up the switch over inasmuch as each AMC unit would make the same decision and eventually the 13 SELECT will go high.

Figure 6:
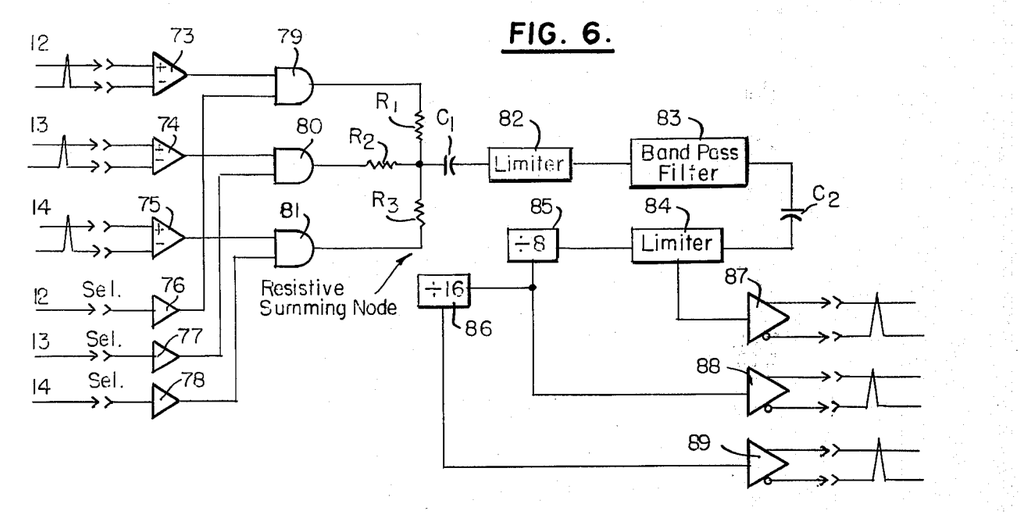
FIG. 6 is a detailed block diagram of a clock switch 15.

FIG. 6 illustrates the apparatus included within the switch 15 (FIG. 1). Three amplifiers 73, 74 and 75 each provide an input to a different AND gate of AND gates 79, 80 and 81. The second input to each of these AND gates comes from a different one of buffer amplifiers 76, 77 and 78. The output of each of the AND gates 79, 80 and 81 are connected, respectively through resistors R1, R2 and R3 to one terminal of capacitor C1, the other terminal of capacitor C1 is connected, through limiter 82 and band pass filter 83 to one terminal of a capacitor C2. The other terminal of capacitor C2 is connected to the input of limiter 84. One output of limiter 84 provides an input for output amplifier 87. The other output of limiter 84 provides an input to a divide by 8 circuit 85 whose output drives output amplifier 88. The output of divider 85 is also provided to a divider 86 whose output amplifier 89.

The inputs to each of amplifiers 73, 74 and 75 come, respectively, from the local oscillator of timing generators 12, 13 and 14. The input to amplifier 76, 77 and 78 are respectively a 12 SELECT signal, 13 SELECT signal and 14 SELECT signal. Normally, in the slave mode, each of the select signals is activated and thus each of the AND gates 79 through 81 are enabled. As a result, the oscillator outputs pass the gates and are summed through resistors R1, R2 and R3. Capacitor C1 provides capacitive coupling to a limiter 82 to generate a square wave and then feeds a band pass filter. The filter is provided to smooth any transients produced by the switching process and allows only the fundamental frequency to pass. The filter output is again limited and then is provided as the primary output, to driver 16 (FIG. 1). The output of the limiter is divided and the sub-multiple frequency is provided to drive driver 17 through output amplifier 88. Similarly the output of the divider 85 is again divided to provide a further sub-multiple frequency which drives driver 18 through output amplifier 89. If any one or two timing generators fail, in the slave mode, the output of the majority logic module will turn that oscillator off and thus, the resistive summing network will receive only to or one inputs respectively. In the master mode only one timing generator is selected, since the timing generators are not phase locked. However, if the normally selected timing generator fails, another will be selected.

Mention has been made, in the discussion with respect to the apparatus illustrated in FIG. 3 that a number of control and timing signals are generated by the chain and timing generation apparatus 45. Two of the signals CONVERT and LATCH are merely (except that LATCH is inhibited by MASTER/SLAVE) divided replicas of the local oscillator input to that apparatus. However, MASTER/SLAVE and RECOVERY are generated in response to the MASTER ON/OFF derived from the associated AMC unit. The manner in which these signals are derived will now be explained with reference to the detail block diagram of FIG. 7.

Figure 7:
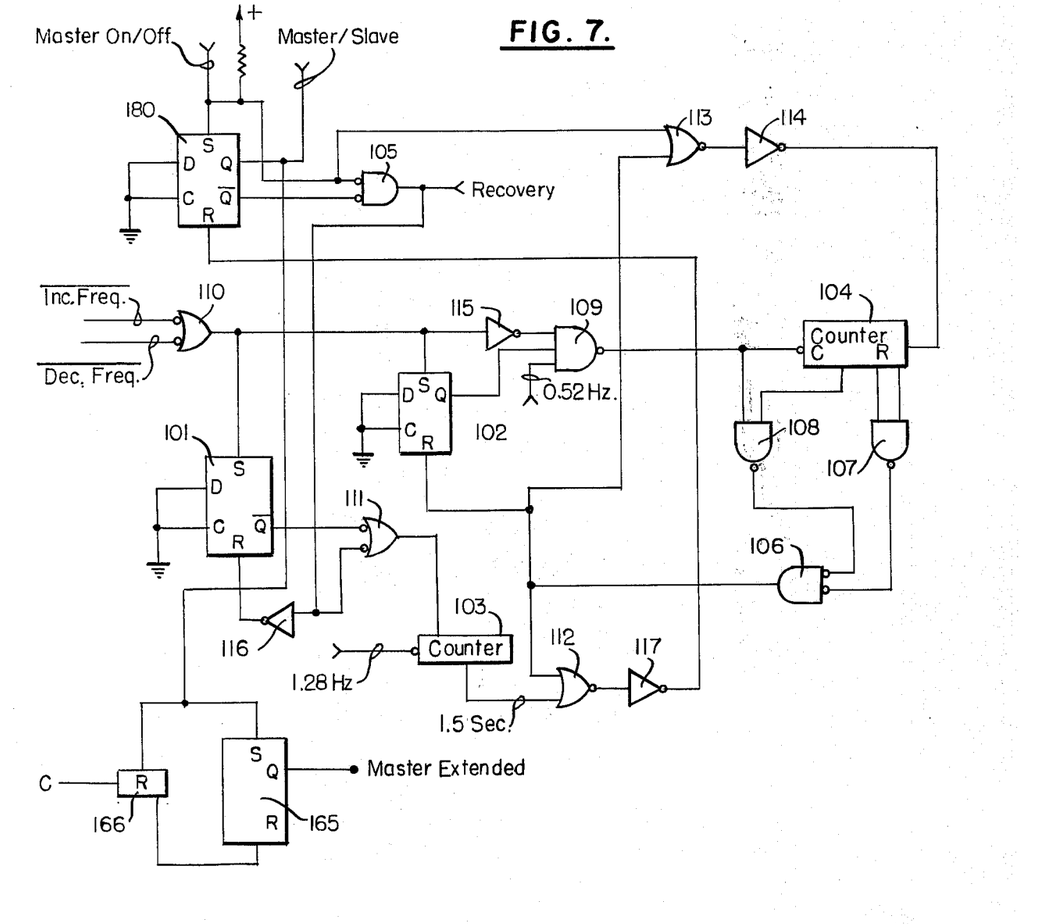
FIG. 7 is a detailed block diagram of the phase lock loop frequency division chain and timing generation.

As shown in FIG. 7 the MASTER ON/OFF provides a set input to a flipflop 100, whose D and C inputs are grounded. The Q output of flipflop 100 provides the MASTER/SLAVE signal. The set input of flipflop 100 is provided as one input to AND gate 105, whose other input is provided by the Q output of flipflop 100. The output of AND gate 105 provides inputs to OR gate 111 and inverter 116. The INCREASE FREQUENCY and DECREASE FREQUENCY signals are the inputs to an OR gate 110 whose output provides the set input to flipflops 100 and 102 as well as the input to inverter 115. The D and C inputs of both flipflops 101 and 102 are grounded. The Q output of flipflop 101 provides the remaining input to OR gate 111 and the output of inverter 116 provides the reset input to flipflop 101. The output of OR gate 111 provides the reset input to a counter 103 which is provided with a 1.28 Hz clocking signal. Counter 103 produces an output approximately 1.5 seconds after its reset signal is removed and this provides an input to NOR gate 112. The Q output of flipflop 102 provides an input to a NAND gate 109, another of whose inputs is provided by the inverter 115. The last input to NAND gate 109 is a 0.52 Hz clocking signal. The output of NAND gate 109 is provides as the clocking input to a counter 104. The output of NAND gate 109 is also provided as one input to a NAND gate 108. The other input to NAND gate 108 and the two inputs to NAND gate 107 are derived from different outputs of counter 104 such that NAND gates 107 and 108 are both enabled 256 seconds after counter 104 begins counting. The outputs of NAND gates 107 and 108 form the inputs to AND gate 106 which is, consequently, enabled 256 seconds after counter 104 begins counting. The output of AND gate 106 provides the remaining input to NOR gate 112 as well as the reset input to flipflop 102 and an input to NOR gate 113. The other input to NOR gate 113 is provided by the MASTER ON/OFF signal previously referred to. The output of NOR gate 113 forms the input for inverter 114 whose output provides the reset input for counter 104. The output of NOR gate 112 is the input for inverter 117 whose output is the reset input for flipflop 100.

When the apparatus of our invention is in the SLAVE mode, the MASTER ON/OFF signal is low and flipflop is reset as will be shown in the subsequent discussion. As a result, AND gate 105 is not enabled. In addition, flipflops 101 and 102 are also reset as will be shown hereinafter. Consequently, NAND gate 109 is not enabled. As will be shown hereinafter counter 104 is normally reset, thus NAND gates 107, 108 and AND gate 106 are not enabled.

When the apparatus determines that the remotely transmitted signal is unavailable the MASTER ON/OFF goes high setting flipflop 100 which directly produces the MASTER/SLAVE signal. As previously explained, this has the effect of opening the phase lock loop at multiplexer 40. In addition, the MASTER ON/OFF signal which provides an input to NOR gate 113 ensures that counter 104 will be reset in the MASTER mode. When the remotely transmitted signal is again detected as available, the MASTER ON/OFF signal drops. Flipflop 100, however, does not change state at this time and thus the MASTER/SLAVE signal continues to be available. However, gate 105 is now enabled to produce the RECOVERY signal. The signal is transmitted to the associated AMC unit which, assuming a unanimous or majority vote of the various timing generators indicate that recovery is to be initiated, will transmit a RECOVERY signal to the majority logic module where, again, assuming a majority or unanimous vote, the RECOVERY gate (see FIG. 1) will be transmitted to the RECOVERY mode interface 26. In the event that the interface 26 does not respond with an increase or decrease frequency signal, the timing generator will, after timing a period of 1.5 seconds, terminate the RECOVERY mode and enter the SLAVE mode. Since flipflop 101 was reset, its $\overline{Q}$ output was high. However, previous to the generation of the RECOVERY signal, the output of gate 105 was low, this ensuring a high output of OR gate 111 maintaining counter 103 reset. However, when the RECOVERY signal is produced, this, going high, removes the high output of gate 111. Thus, counter 103 begins counting. If it is allowed to count for a period of 1.5 seconds, its output will go high forcing NOR gate 112 to produce a low output (the other input to OR gate 112 is low). The low output of NOR gate 112 produces a high output of inverter 117 and this resets flipflop 100. This has the effect of terminating the MASTER/SLAVE signal as well as the RECOVERY signal. As a result of the termination of the MASTER/SLAVE signal multiplexer 40 is now allowed to pass the phase lock loop error voltage and thus the loop is then closed. Termination of the RECOVERY signal ensures that flip-flop 101 is reset as well as resetting counter 103.

However, assuming that the interface 26 responds with either an increase or decrease frequency signal prior to the expiration of the 1.5 second period, then flipflops 101 and 102 become set. At flipflop 101, this has the effect of producing a low output from $\overline{Q}$ ensuring that counter 103 is reset, through OR gate 111. At flipflop 102, the Q output goes high. At the termination of the increase or decrease frequency signal, from the recovery interface, inverter 115 again produces a high output. At this point NAND gate 109 is enabled to pass clocking signals to counter 104. As has previously been explained, counter 104 was held reset when the MASTER ON/OFF signal was high. When that signal terminated, there was nothing holding counter 104 reset but, however, until NAND gate 109 was enabled, the counter did not receive any clocking signals. Thus, counter 104 now begins counting and at the expiration of 256 seconds after the termination of the increase or decrease frequency signal, gates 107 and 108 are enabled to produce low outputs which produces a high output from AND gate 106. The signal has a number of effects. In the first place, through NOR gate 113 and inverter 114, counter 104 is reset. In addition, flipflop 102 is reset to disable NAND gate 109. Finally, flipflop 100 is reset through OR gate 112 and inverter 117. The effect of resetting flipflop 100 has previously been explained.

In addition to the foregoing the MASTER/SLAVE signal provides a set input for flipflop 165 and a reset input for counter 166, Counter 166 provides flipflop 165 with a reset signal a predetermined (3 seconds in the referred to embodiment) time after it is reset is removed. The Q output of flipflop 165 is the MASTER EXTENDED signal.

Thus, the MASTER ON/OFF signal immediately generates the MASTER/SLAVE and MASTER EXTENDED signals. When the MASTER ON/OFF signal terminates, the MASTER/SLAVE and MASTER EXTENDED signals are maintained but, however, the RECOVERY signal is produced. If no response is received from the recovery gate interface within a period of 1.5 seconds following appearance of RECOVERY, the recovery mode terminates, the MASTER/SLAVE signal drops, and the phase lock loop is closed for normal operation. If, however, in a period of 1.5 seconds following appearance of RECOVERY, the recovery gate interface responds with an increase or decrease frequency signal, then counter 104 counts a period of 256 seconds following the termination of the increase or decrease frequency signal. Only at the termination of that 256-second interval does the recovery period terminate, the MASTER/SLAVE signal drop, and the loop return to normal closed loop operation. Finally, approximately 3 seconds after MASTER/SLAVE drops the MASTER EXTENDED also drops.

Figure 8:
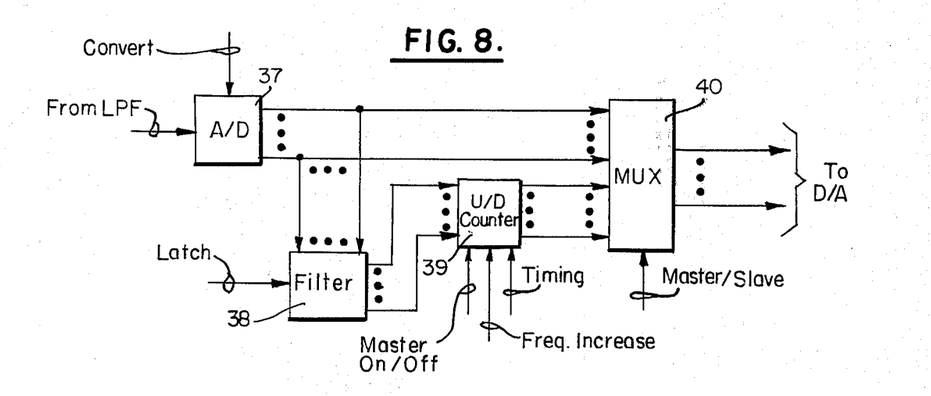
FIG. 8 is a detailed block diagram of the connections between A/D convertor 37, multiplexer 40, filter 38 and memory 39.

As has been explained above the purpose of the recovery mode is to allow the control of the local oscillator to be modified to achieve synchronism with the now available remotely transmitted signal. Furthermore, as has been explained above in the master mode, or in the recovery mode, the local oscillator is commanded by an error voltage which is derived from memory 39. Of course, in the memory 39 the error voltage exists in digital form and, in the master mode this value is a digital representation of the "average" error voltages accumulated by filter 38. When the recovery mode is entered the contents of the memory 39 still control the oscillator frequency; however, the contents of the memory 39 may be slowly varied as a result of signals received at the recovery mode interface. FIG. 8 is a detailed block diagram of a portion of the apparatus shown in FIG. 3, particularly the analog to digital convertor 37, filter 38, memory 39 (which in FIG. 8 is labeled U/D counter) and multiplexer 40. As is shown in FIG. 8 the digital values pass from unit to unit and they include a plurality of bits on a number of line wires connecting the units equal in number to the number of bits in a digital value. As has been previously explained the CONVERT signal allows the A/D convertor to convert the analog error voltage from the low pass filter 36 to a digital equivalent. At predetermined intervals the LATCH signal allows the most recently converted error voltage to be inserted into the filter 38 to update the running "average". The output of filter 38 is continuously available to U/D counter 39 although it has no effect thereon. When the MASTER ON/OFF signal is provided to U/D counter 39 the filter output is inserted therein. As a result, shortly thereafter U/D counter makes available to multiplexer 40 the digital value provided by filter 38. Furthermore, this value is retained in the counter 39 which therefore serves as a memory. When the MASTER/SLAVE signal is generated (as explained with reference to FIG. 7) the multiplexer 40 allows the input from counter 39 to pass to the D/A convertor instead of the output of A/D convertor. So long as the MASTER/SLAVE signal is present then the phase lock loop is effectively opened.

In order to prevent the filter 38 from accumulating samples of error voltage during the MASTER/SLAVE or RECOVERY, the signal LATCH is terminated at the initiation of the master mode (by the $\overline{Q}$ output of flipflop 100) and LATCH does not reappear until the recovery mode terminates when the $\overline{Q}$ output of flipflop 100 again goes high. Thus, as soon as MASTER ON/OFF appears filter 38 ceases to accumulate new averages and the only manner in which the contents of U/D counter 39 can be varied is via a co-joint action of the signals frequency increase and timing. The timing signal (shown as an input to U/D counter 39 in FIG. 8) is provided by the timing chain 45 (FIG. 3) and is a sub-multiple of a local oscillator frequency. During the recovery mode the associated equipment, with which a station clock of this invention communicates through the recovery mode interface, determines the extent to which the station clock oscillator and remotely transmitted signal vary in frequency as well as the polarity of this difference. The polarity of the signal FREQUENCY INCREASE determines whether the U/D counter 39 counts up or down. The duration of the signal determines the amount by which U/D counter 39 counts up or down from the initial count provided by filter 38. In this fashion the digital quantity provided by the counter 39 to multiplexer 40 can be varied during the recovery mode to thereby compensate for possible drift between the local oscillator of any timing generator and the remotely transmitted signal during the master mode.

Figure 9A:
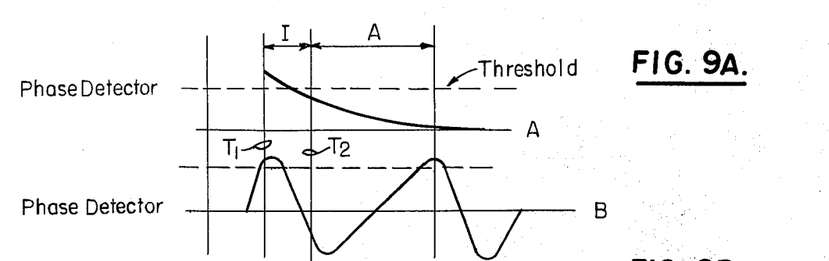
FIGS. 9A and 9B are respectively typical wave forms and a detailed block diagram of a portion of a phase failure detector.
Figure 9B:
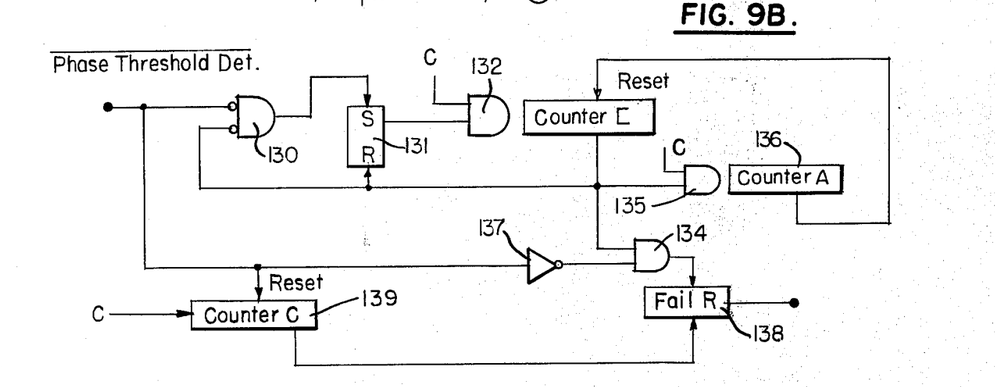

FIG. 9B is a detailed block diagram which is typical of a phase failure detector. FIG. 9A illustrates typical wave forms which are helpful in the explanation of the operation of the phase failure detectors.

FIG. 9A shows typical phase detector outputs as a function of time with respect to a phase detector threshold level. This level is established by a voltage comparator preceeding gate 130. In the first curve (A) the phase detector output changes abruptly at time $T_1$, to exceed the threshold level. The phase detector output then decays, exponentially, approaching 0. The phase failure detectors employed in FIG. 3 establish a pair of time periods. A first period I is called the integration period, and the second period A is referred to as the aperture period. After the phase threshold detector produces an output the apparatus delays for the integration time and then looks for subsequent phase detector outputs exceeding the threshold level during the aperture period. If, during the aperture period, the phase detector output again exceeds the threshold level, a failure is declared and a corresponding signal is generated. If, after a failure, there are no subsequent excursions beyond the phase detector threshold for a third time, called the clear time, then the declared failure is indicated as having cleared. The theory behind this operation is based on the fact that the A curve indicates a phase hit, wherein phase abruptly changes and then returns to normal. The B curve, however, indicates a change in frequency for the phase detector output indicates that the voltage controlled oscillator is unable to synchronize with the input to the phase lock loop. The apparatus to determine the integration period, the aperture period and the clear period and signal the failure is illustrated in FIG. 9B. As has been mentioned above the phase detector outputs are compared, in a voltage comparator with a threshold level and the output of that comparator (comprising a voltage signal termed $\overline{\text{PHASE THRESHOLD DETECTOR}}$) is provided as the set input to a flipflop 131. The Q output of flipflop 131 is provided as one input to an AND gate 132 which controls the input to a counter I 133. At a predetermined count of counter 133 an output is provided to AND gates 134, 135 and the reset input of flipflop 131. The same signal also provides the second input to AND gate 130. AND gate 135 controls the state of a counter A 136. When counter A reaches a predetermined count it provides a reset input to counter I 133. The PHASE THRESHOLD DETECTOR signal also provides an input to an inverter 137 which provides the second input to AND gate 134. The output of AND gate 134 provides the set input for a flipflop 138. The counter C 139 is reset by the PHASE THRESHOLD DETECTOR signal. Upon reaching a predetermined count, counter 139 provides a reset input to flipflop 138. Clocking signals which may be at different frequencies are provided to counter C, AND gate 135 and AND gate 132. The output of flipflop 138 is the failure signal.

In operation when a phase detector output exceeds the threshold level an input is provided to AND gate 130. So long as counter 133 is not at its preset count AND gate 130 is enabled and sets flipflop 131. This enables AND gate 132 to begin counting. Counter 133 sets the integration delay interval for any subsequent voltage signals, during the integration interval, are ineffective to affect the apparatus of FIG. 9B. When counter I 133 reaches the predetermined count a number of actions occur. In the first place, AND gate 135 is enabled to allow counter A 136 to begin counting the aperture time. In addition, AND gate 134 is enabled, flipflop 131 is reset and AND gate 130 is disabled. During the period in which counter A 136 is counting any excursions of the phase detector above the threshold will be considered a failure. Thus, the signal evidencing any such excursion will, after being inverted by inverter 137 and passing AND gate 134, set flipflop 138. This provides the failure signal. If, however, during the aperture period set by counter 136, the phase detector output does not exceed the threshold, counter 136 will count up to its predetermined count providing the reset input for counter 133. The only effect this has is to remove the disabling input from AND gate 130 so now further $\overline{\text{PHASE THRESHOLD DETECTOR}}$ signals can again set flipflop 131. In the embodiment previously referred to the integration delay counted 200 milliseconds and the aperture counter counted 400 milliseconds. Finally, after a failure has been detected, the failure indication is cleared if, for an unbroken period of time (in the referred to embodiment 500 milliseconds) the phase detector output does not exceed the threshold. The failure is cleared by the conjoint action of the counter C 139 and flipflop 138. Each time the $\overline{\text{PHASE THRESHOLD DETECTOR}}$ signal is produced counter C 139 is reset. This is a free running counter which counts the clear period, in the referred to embodiment 500 milliseconds. Any time counter C 139 is allowed to reach its predetermined count it will reset flipflop 138 and thus clear the failure signal.

Figure 10:
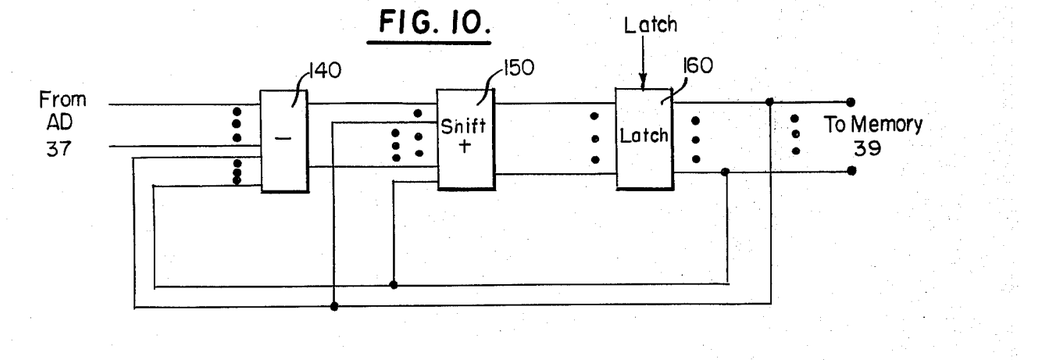
FIG. 10 is a detailed block diagram of the filter 38.

FIG. 10 is a detailed block diagram of the digital filter 38.

Digital filter 38 comprises substractor 140, shifter and adder 150 and latching unit 160. The digital output from A/D convertor 37 is provided as one input to subtractor 140. The second input to subtractor 140 comprises the output of the filter derived from the latching unit 160. As has been previously mentioned digital filter 38 is supplied with samples of the phase lock loop error voltage at a rate which is effectively determined by the LATCH signal. Thus the output of subtractor 140 is the difference between the "running average" supplied by the filter and the latest sample from A/D convertor 37. This difference is shifted and added in shifter and adding unit 150 to the "running average". The output of shifter and adder 150 is stored, in response to the LATCH signal in the latching unit 160.

The recovery mode interface 26 (shown in FIG. 1) need not be described in any further detail. The associated equipment, with which the station clock of this invention cooperates, requires push pull signals whereas the signals employed in the control portion of the station clock of this invention, are single ended. The recovery mode interface 26 therefor, merely translates the signal ended single RECOVERY GATE transmitted from the station clock to the associated equipment from a single ended to a double ended signal and, correspondingly, translates the FREQUENCY INCREASE and FREQUENCY DECREASE signals from the associated equipment which are generated in push pull form to single ended signals for operating the various timing generators 12, 13 and 14.

Although it is believed that the operation of the apparatus heretofore described is clear from the previous description, the operation will be briefly summarized, as an aid to the reader. In normal, operation, select control switch 11 (FIG. 1) selects the effective remotely transmitted signal which is then provided to each of the timing generators 12, 13 and 14. Assuming normal operation with an effective input signal, the phase lock loop in each of timing generators 12, 13 and 14 will operate closed loop, that is with multiplexer 40 passing the output of A/D convertor 37 to the input of D/A convertor 41. During this time, however, filter 38 maintains a "running average" of the loop error voltage. Furthermore, assuming correct operation, there will be no failure signals generated by the timing generators 12, 13 and 14. As a result, the signals $\overline{\text{SELECT 12}}$, $\overline{\text{SELECT 13}}$, and $\overline{\text{SELECT 14}}$ (FIG. 4D) will all be low. As a result, each of gates 79, 80 and 81 will be enabled (FIG. 6) and the output of each of the timing generators 12, 13 and 14 will be summed and provided to limiter 82 for eventual distribution to the output port. Assuming, however, that an amplitude detector 43 on a single timing generator, or a pair of memory comparators 46 or pair of phase comparators 44 in two different timing generators indicate a failure, then the majority logic of the automatic mode control unit (FIG. 4C) will indicate which unit has failed. Furthermore, the $\overline{\text{SELECT A}}$ signal corresponding to that timing generator will go high this will result in a corresponding gate 79, 80 or 81 being disabled, and thus the outputs of only the two good timing generators will be summed and provided to the output port.

If, however, the detectors 34 or 47 indicate that the remotely transmitted input has failed, failure signals will be generated. At the automatic mode control units (FIGS. 4C and 4D) the concurrence of the various generators will be determined. If the vote is unanimous, or at lease a majority indicate a failure of the remotely transmitted signal, then OR gate 64 will generate MASTER ON/OFF. Since this signal is directed to the respective timing generator, as well as to the majority logic unit, the associated timing generator will begin operating open loop. That is, the MASTER ON/OFF will, back at the timing generator, generate the MASTER/SLAVE (see FIG. 7). The co-joint actions of MASTER ON/OFF and MASTER/SLAVE will cause memory 39 to be loaded with the present average maintained in the filter 38 and will switch multiplexer 40 so as to control the oscillator by the now stored error signal. Furthermore, appearance of the MASTER/SLAVE signal will also generate MASTER EXTENDED (see FIG. 7). At the automatic mode control unit (see FIG. 4D) this will cause each of the $\overline{\text{SELECT 13}}$ and $\overline{\text{SELECT 14}}$ to go high and allow only $\overline{\text{SELECT 12}}$ to go low. At the clock switch 15 (see FIG. 6) only the output of timing generator 12 will pass its associated gate 79. Gates 80 and 81 will be disabled and thus only the output of timing generator 12 will be provided to the output port.

At the time that the failure is cleared, either the remotely transmitted signal again increases in amplitude or corrects its frequency deviation, the automatic mode control unit associated with the timing generator now indicates no failures (see FIG. 4C) which will cause the MASTER ON/OFF to drop. At the associated timing generator, the change in MASTER ON/OFF, will generate the RECOVERY signal (see FIG. 7). Majority votes are then taken at each of the automatic mode control units (see FIG. 4C) as well as the majority logic module (see FIG. 5). If at least a majority are voting for recovery, then the RECOVERY gate will be generated. As is shown in FIG. 1 this is applied to the recovery mode interface 26 which then requests a frequency increase or a frequency decrease signal. If no such signal is provided within the 1.5 second period set by counter 103 (see FIG. 7) the recovery mode terminates and the loops are again allowed to operate in closed loop form. If either a frequency increase or frequency decrease signal is provided, the memory 39 is either incremented or decremented corresponding to the received signal. At the conclusion of the increase frequency or decrease frequency signal a 256 second period is timed out at the conclusion of which the recovery mode terminates. Approximately 3 seconds thereafter the MASTER EXTENDED signal drops and the clock then operates in a normal slave mode.

What is claimed is:

1. A phase lock loop for generating a stable reconditioned signal in response to a remotely transmitted signal and for independently producing said signal when said remotely transmitted signal is unavailable, comprising;
   an input port responsive to said remotely transmitted signal and having serially connected thereto,
   a phase detector,
   a low pass filter,
   an analog to digital convertor,
   a multiplexer,
   a digital to analog convertor, and to a voltage controlled oscillator, said voltage controlled oscillator providing a second input to said phase detector,
   memory means, including filter means, serially connected between said analog to digital convertor and said multiplexer for storing a filtered digital representation of the output of said analog to digital convertor,
   means for detecting unavailability of said remotely transmitted signal, and
   switch means responsive to detected failure of said remotely transmitted signal for controlling said multiplexer to be responsive only to said memory means.

2. The apparatus of claim 1 in which said means for detecting unavailability of said remotely transmitted signal includes an amplitude detector means for producing a signal if amplitude of said remotely transmitted signal drops below a predetermined threshold.

3. The apparatus of claim 1 in which said means for detecting unavailability of said remotely transmitted signal includes a phase detector means producing a signal when said oscillator fails to synchronize with said remotely transmitted signal.

4. The apparatus of claim 1 in which said filter means includes means for deriving an n-sample average of outputs of said analog to digital convertor and means, responsive to operation of said means for detecting unavailability of said signal for storing said n-sample average in said memory means.

5. Synchronized Master/Slave clock for locally distributing, from an output port, a stable reconditioned signal synchronized with a remotely transmitted signal and also capable of independently producing said signal when said remotely transmitted signal is unavailable, comprising;
   a. at least three timing generator means, each of said timing generator means including,
      i. a phase lock loop responsive to said remotely transmitted signal for producing said stable reconditioned signal,
      ii. memory means, including filter means, connected to said phase lock loop retaining a quantity indicative of the frequency generated thereby,
      iii. loop switch means for opening said phase lock loop and connecting said memory means to control said loop oscillator,
      iv. means for detecting unavailability of said remotely transmitted signal and for producing a signal indicative thereof, and
      v. means for detecting failure of said phase lock loop and for producing a signal indicative thereof,
   b. switch means selectively connecting said stable reconditioned signals to said output port,
   c. majority voting logic means responsive to said plurality of failure indicating signals and connected to said switch means for selectively controlling said switch means to connect one or more of said stable reconditioned signals to said output port, said majority voting logic means also connected to said loop switch means and responsive to signals indicative of failure of said remotely transmitted signal for operating said loop switch means.

6. The apparatus of claim 5 in which said means for detecting unavailability of said remotely transmitted signal includes an amplitude detector means for producing a signal if amplitude of said remotely transmitted signal drops below a predetermined threshold.

7. The apparatus of claim 5 in which said means for detecting unavailability of said remotely transmitted signal includes a phase detector means producing a signal when said oscillator cannot synchronize with said remotely transmitted signal.

8. The apparatus of claim 5 in which said means for detecting failure of said phase lock loop includes an amplitude detector means for producing a signal if amplitude of said loop oscillator signal drops below a predetermined threshold.

9. The apparatus of claim 5 in which said a (v) means includes a phase detector connected to said loop oscillator output and to a loop oscillator of another said timing generator and voltage comparator means to produce a voltage signal when said phase detector output exceeds a predetermined threshold.

10. The apparatus of claim 9 in which said a (v) means further includes a failure signal generating means, means for enabling said failure signal of generating means a predetermined period after said voltage comparator produces said voltage signal, said failure signal generatius means producing a failure signal if, and only if, said voltage comparator produces said voltage signal when said failure signal generating means is enabled.

11. The apparatus of claim 10 in which said a (v) means includes means for disabling said failure signal generating means if, within a second predetermined period after being enabled said failure signal generating means does not generate a failure signal.

12. The apparatus of claim 11 which further includes means for clearing said failure signal generating means after generating said failure signal, means for responding to an absence of said voltage signal within a third predetermined period after any of said voltage signals, said means for clearing operating in response to said means for responding.

* * * * *